United States Patent
Crawford et al.

(10) Patent No.: US 10,564,269 B2
(45) Date of Patent: Feb. 18, 2020

(54) COMPACT TEST RANGE FOR ACTIVE OPTICAL TARGET DETECTORS

(71) Applicant: Raytheon Company, Waltham, MA (US)

(72) Inventors: John Crawford, Vail, AZ (US); John Millard, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/896,256

(22) Filed: Feb. 14, 2018

(65) Prior Publication Data

US 2019/0250258 A1 Aug. 15, 2019

(51) Int. Cl.
| | | |
|---|---|---|
| G01S 7/497 | (2006.01) |
| G02B 6/42 | (2006.01) |
| G01S 17/10 | (2020.01) |
| G02F 1/01 | (2006.01) |

(52) U.S. Cl.
CPC .............. G01S 7/497 (2013.01); G01S 17/10 (2013.01); G02B 6/4298 (2013.01); G02F 1/0115 (2013.01); G02B 6/4206 (2013.01)

(58) Field of Classification Search
CPC .................................................. G02B 6/4206
USPC ............................................................. 356/6
See application file for complete search history.

(56) References Cited

U.S. PATENT DOCUMENTS

| | | |
|---|---|---|
| 4,068,952 A | 1/1978 | Erbert et al. |
| 4,189,233 A | 2/1980 | Cross et al. |
| 4,552,454 A | 11/1985 | Glaser et al. |
| 4,624,567 A * | 11/1986 | Dick ................... G01N 15/0227 356/335 |
| 4,627,723 A | 12/1986 | French et al. |
| 5,825,464 A | 10/1998 | Feichtner |
| 2010/0329693 A1* | 12/2010 | Chen ..................... H04B 10/85 398/147 |

(Continued)

FOREIGN PATENT DOCUMENTS

| | | |
|---|---|---|
| CN | 107390201 A | 11/2017 |
| JP | 2001-281091 | * 10/2001 ............ G01M 11/00 |
| RU | 2636797 C1 | 11/2017 |

OTHER PUBLICATIONS

Fontemational Search Report and Written Opinion of the International Searching Authority dated Dec. 12, 2018 in nnection with International Patent Application No. PCT/US2018/053239, 42 pp.

*Primary Examiner* — Hina F Ayub

(57) ABSTRACT

For test/calibration of an electro-optic range-finding device, one or more fiber bundles each are selected to have a length corresponding to predetermined time-of-flight for light pulses. An input end is positioned proximate to the laser aperture of the range-finding device to receive a portion of light emitted through the laser aperture, and the output end is positioned to emit light from the respective fiber bundle through the detector aperture of the range-finding device. A fiber attenuator is connected along each fiber of the one or more fiber bundles to attenuate an amplitude of light propagating through the respective fiber by an amount corresponding to a target of known reflectance and distance. The one or more fiber bundles are each coiled to reduce a linear distance over which the one or more fiber bundles extend. The one or more fiber bundles may each comprise a plurality of fibers.

20 Claims, 4 Drawing Sheets

(56) References Cited

U.S. PATENT DOCUMENTS

2016/0161683 A1* 6/2016 Joseph ................ G02B 6/4206
                                                                   398/212
2018/0348119 A1* 12/2018 Hwang ................ G01N 21/255

* cited by examiner

COMPACT TEST RANGE FOR ACTIVE OPTICAL TARGET DETECTORS

TECHNICAL FIELD

The present disclosure is directed in general to test or calibration systems for optical target detectors and more particularly to reducing the space required for and the accuracy of such test or calibration systems.

BACKGROUND OF THE DISCLOSURE

Optical target detectors may be tested and/or calibrated using a flat target of known reflectance at several distances. However, the space required can be sizable and costly, and accuracy may be influenced by spurious reflectance or emissions from background objects.

SUMMARY OF THE DISCLOSURE

In a first embodiment, a test system for an electro-optic range-finding device is positioned proximate to a laser aperture and a detector aperture for the range-finding device to be tested. One or more fiber bundles each has a length selected to correspond to predetermined time-of-flight for light pulses to travel from the laser aperture to the detector aperture. An input end of each of the one or more fiber bundles is positioned proximate to the laser aperture to receive a portion of light emitted through the laser aperture. An output end of each of the one or more fiber bundles is positioned proximate to the detector aperture to emit light from the respective fiber bundle through the detector aperture. A fiber attenuator is connected along each fiber of the one or more fiber bundles to attenuate an amplitude of light propagating through the respective fiber by an amount corresponding to a target of known reflectance and distance. The one or more fiber bundles are each coiled to reduce a linear distance over which the one or more fiber bundles extend. The one or more fiber bundles may each comprise a plurality of fibers. The one or more fiber bundles may comprise a first fiber bundle having a first length corresponding to a first time-of-flight for light pulses and a second fiber bundle having a second length corresponding to a second time-of-flight for light pulses. The fiber attenuators connected along each fiber of the first fiber bundle may each attenuate an amplitude of light pulses within a respective fiber by at least an amount corresponding to the first time-of-flight for light pulses propagating a first distance in open air, and the fiber attenuators connected along each fiber of the second fiber bundle may each attenuate an amplitude of light pulses within a respective fiber by at least an amount corresponding to the second time-of-flight for light pulses for light pulses propagating a second distance in open air. The one or more fiber bundles may comprise a plurality of fiber bundles, in which case the input ends of the fiber bundles may be distributed at spaced-apart points along a cross-section of the light emitted through the laser aperture. When the one or more fiber bundles comprises a plurality of fibers, a positional mask may be disposed between at least one of the input ends and the output ends of the fibers, the positional mask including an aperture that one of allows light from the laser aperture to enter one of the fibers while blocking light from the laser aperture from entering remaining ones of the fibers, or allows light from one of the fibers to enter the detector aperture while blocking light from remaining ones of the fibers from entering the detector aperture. When present, the positional mask may multiplex one of light from the laser aperture to the fibers or light from the fibers to the detector aperture.

In a second embodiment, during testing, an electro-optic range-finding device is positioned proximate to a testing system and operated to emit light pulses through a laser aperture and receive light through a detector aperture. One or more fiber bundles are positioned to carry a portion of light in the light pulses from the laser aperture to the detector aperture, each of the one or more fiber bundles each having a length selected to correspond to a predetermined time-of-flight for the light pulses to travel from the laser aperture to the detector aperture. An input end of each of the one or more fiber bundles is positioned proximate to the laser aperture to receive a portion of light emitted through the laser aperture, and an output end of each of the one or more fiber bundles is positioned proximate to the detector aperture to emit light from the respective fiber bundle through the detector aperture. A fiber attenuator is connected along each fiber of the one or more fiber bundles to attenuate an amplitude of light propagating through the respective fiber by an amount corresponding to a target of known reflectance and distance. The one or more fiber bundles are coiled to reduce a linear distance over which the one or more fiber bundles extend. The one or more fiber bundles may each comprise a plurality of fibers. The one or more fiber bundles may comprise a first fiber bundle having a first length corresponding to a first time-of-flight for light pulses and a second fiber bundle having a second length corresponding to a second time-of-flight for light pulses. The fiber attenuators connected along each fiber of the first fiber bundle may each attenuate an amplitude of light pulses within a respective fiber by at least an amount corresponding to the first time-of-flight for light pulses propagating a first distance in open air and the fiber attenuators connected along each fiber of the second fiber bundle each attenuate an amplitude of light pulses within a respective fiber by at least an amount corresponding to the second time-of-flight for light pulses for light pulses propagating a second distance in open air. When the one or more fiber bundles comprise a plurality of fiber bundles, the input ends of the fiber bundles may be distributed at spaced-apart points along a cross-section of the light emitted through the laser aperture. When the one or more fiber bundles comprises a plurality of fibers, a positional mask may be disposed between at least one of the input ends and the output ends of the fibers, the positional mask including an aperture that one of allows light from the laser aperture to enter one of the fibers while blocking light from the laser aperture from entering remaining ones of the fibers, or allows light from one of the fibers to enter the detector aperture while blocking light from remaining ones of the fibers from entering the detector aperture. When present, the positional mask may multiplex one of light from the laser aperture to the fibers or light from the fibers to the detector aperture.

In a third embodiment, a test/calibration system includes: a first fiber bundle having a first length selected such that time-of-flight for light pulses to travel from an input end of the first fiber bundle to an output end of the first fiber bundle corresponds to time-of-flight for the light pulses to travel a first distance in open air; a first fiber attenuator connected along each fiber of the first fiber bundle to attenuate an amplitude of light propagating through the respective fiber by an amount corresponding to reflection of light traveling in open air from a target of known reflectance at the first distance; a second fiber bundle having a second length selected such that time-of-flight for light pulses to travel from an input end of the second fiber bundle to an output end of the second fiber bundle corresponds to time-of-flight for the light pulses to travel a second distance in open air; and a second fiber attenuator connected along each fiber of the second fiber bundle to attenuate an amplitude of light propagating through the respective fiber by an amount corresponding to reflection of light traveling in open air from the target of known reflectance at the second distance, where the first and second fiber bundles are coiled to reduce a linear distance over which the first and second fiber bundles extend. The first and second fiber bundles may each comprise a plurality of fibers. When the first fiber bundle is one of a plurality of fiber bundles having the first length, the input ends of the fiber bundles having the first length may be distributed at spaced-apart points. The test/calibration system may also include an opaque shroud surrounding one of input ends of fibers within the first and second fiber bundles or output ends of fibers within the first and second fiber bundles. The test/calibration system may further include an electro-optic range-finding device having a laser aperture and a detector aperture, wherein an input end of each of the first and second fiber bundles is positioned proximate to the laser aperture to receive a portion of light emitted through the laser aperture, and wherein an output end of each of the first and second fiber bundles is positioned proximate to the detector aperture to emit light from the respective fiber bundle through the detector aperture. When the test/calibration system includes an electro-optic range-finding device, that device may include a light transmitter assembly configured to emit the light pulses through the laser aperture, a light receiver assembly configured to receive light through the detector aperture, and a processor configured to calibrate the electro-optic range-finding device based on light received through the detector aperture from the first and second fiber bundles based on light emitted through the laser aperture into the first and second fiber bundles.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
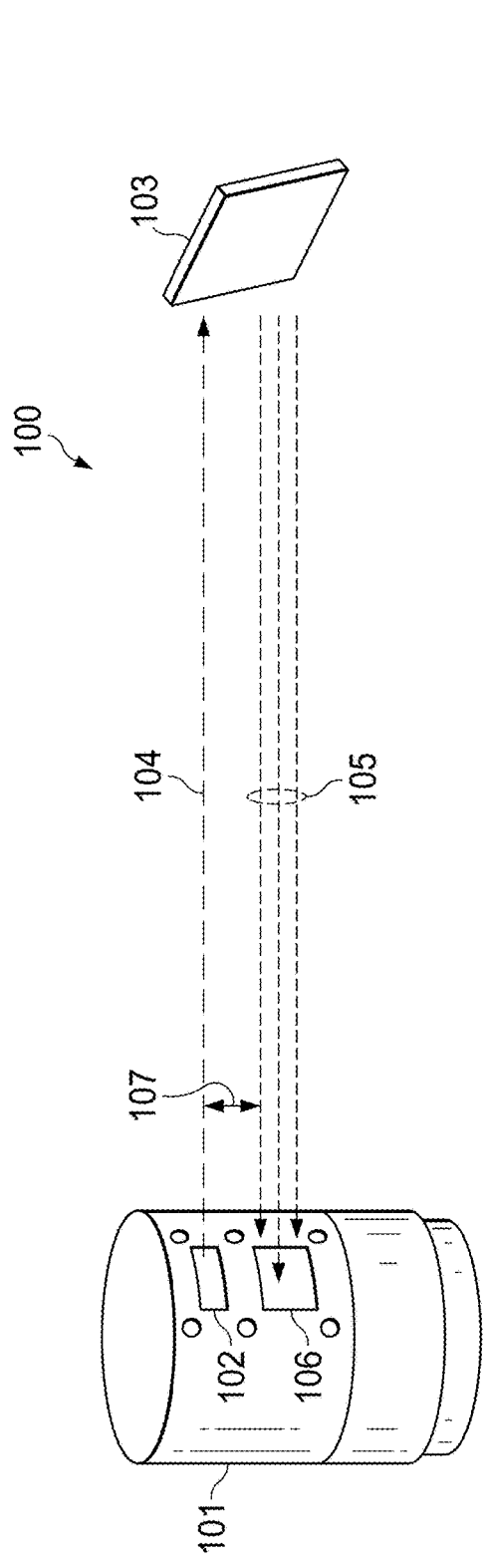
FIGS. 1 and 2 are comparative, high-level diagrams illustrating an electro-optic range-finding device under test and test/calibration system configurations respectively for one alternative to the present disclosure and for embodiments in accordance with the present disclosure.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

Electro-optic (EO) devices such as active optical target detectors (AOTDs) may be employed to detect objects over a range of distances. For example, a missile equipped with "near miss" detection, in order to detonate munitions when the target is within a predetermined range despite the lack of a direct hit, may detect decreasing and then increasing distance to the target as well as whether the current range to the target is less than a maximum distance at which detonation might affect the target. AOTDs of that type often require a "Test Range" to test operability and/or to confirm or set the value of the detection threshold. As a result, AOTDs and similar devices may be tested and calibrated with a flat target of known reflectance at several distances. During this process, the AOTD is generally rotated around its longitudinal axis to scan the fan beam for each 90° quadrant (there are typically four transceivers per AOTD) across a narrow target. Given the target distances, however, test ranges for the test/calibration system may take up a large amount of costly floor space, typically on the order of 40 feet×40 feet.

Figure 2:
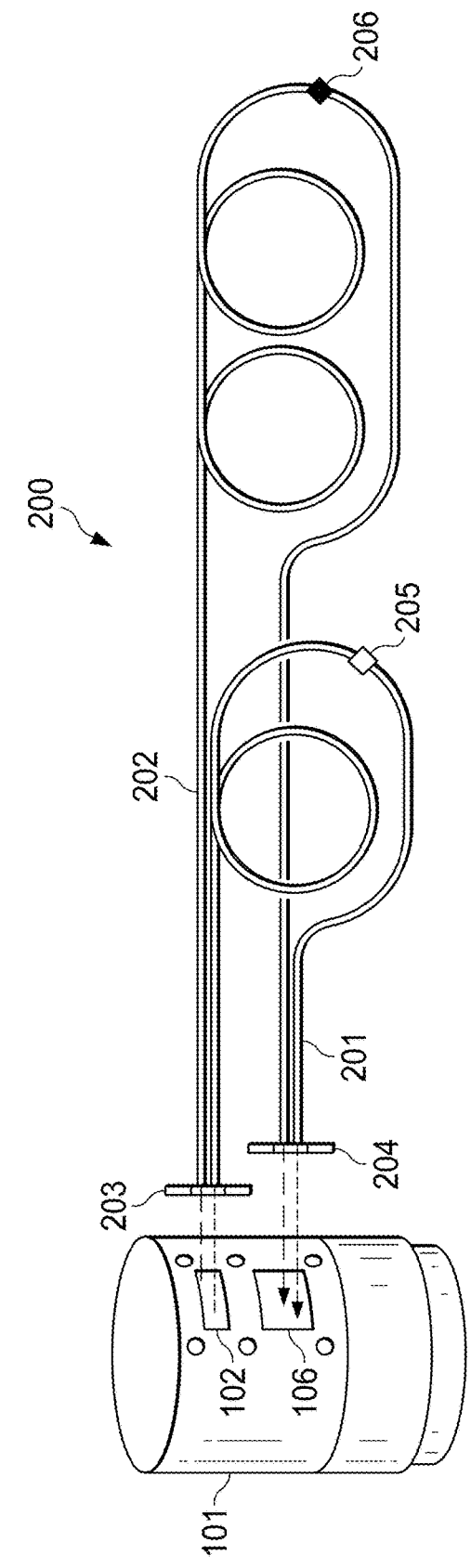

FIGS. 1 and 2 are comparative, high-level diagrams illustrating an electro-optic range-finding device under test and test/calibration system configurations respectively for one alternative to the present disclosure and for embodiments in accordance with the present disclosure. Although depicted in each of FIGS. 1 and 2 for purposes of explanation, the electro-optic range-finding device is used with, but does not form part of, the respective test/calibration system, and may be replaced with another electro-optic range-finding device of the same or different type. In addition, while the test/calibration system configurations of FIGS. 1 and 2 are illustrated for an electro-optic range-finding device having separate, spaced-apart laser and detector apertures (i.e., for which the target exhibits parallax), the test/calibration system of FIG. 2 may be readily modified for use with an electro-optic range-finding device having a single, common laser and detector aperture, FIG. 1 illustrates an electro-optic range-finding device under test and a test/calibration system configuration for one alternative to the present disclosure. In FIG. 1, the test/calibration system 100 is positioned proximate to an AOTD under test that includes four transceivers, one per quadrant, within a housing 101, with each quadrant of the housing 101 including a laser aperture 102 through which a beam of laser pulses is emitted. The AOTD may be, for example, an active ranging device used for air-to-air determination of the distance to a target. Typically, for that application, a thin (almost planar) 90° fan beam of laser pulses is emitted through the laser aperture toward a target to illuminate a 90° quadrant and, if the target is at least partially within the plane of the fan beam, "paint" a line across that target. The laser aperture 102 may be covered by a material that is substantially transparent to the wavelength(s) of the laser beam pulses.

Within the test/calibration system 100, a target 103 of predetermined size and having known reflectance for the wavelength(s) of the laser pulses is positioned within the plane of the fan beam at a predetermined distance from the laser aperture 102, to be irradiated by the portion 104 of the laser pulses. From the portion 104 of the fan beam of laser pulses that impinges on the target 103, some part is reflected (scattered) by the target 103 back in the direction of the housing 101 for the AOTD. Return signals 105, which comprise the portion of the impinging laser beam pulses reflected off the target 103 in the direction of the AOTD housing 101, are received through a detector aperture 106 in the housing 101 for the respective quadrant, and used for testing/calibration. As with the laser aperture 102, the detector aperture 106 may be covered by a material that is substantially transparent to the wavelength(s) of the laser beam pulses.

As apparent, there exists some parallax separation 107 between the laser aperture 102 and the detector aperture 106 in each quadrant. The target 103 is positioned with a known three-dimensional orientation relative to the lines-of-sight from the laser aperture 102 and the detector aperture 106—e.g., "normal" (in the sense of being perpendicular for two independent directions) to a line from the center point between the laser aperture 102 and the detector aperture 106. Due to the parallax separation 107, return signals 105 may differ when the target 103 is located at different positions relative to the laser aperture 102 and detector aperture 106, particularly for different distances (even with the same relative orientation). Accordingly, the target 103 may be positioned at different distances from the housing 101 during testing/calibration, to exploit the correlation between the target distance and the return angle of the reflected laser pulses at the detector aperture 106. Based on the maximum distance required for the testing/calibration to be acceptable and complete, a 40 feet×40 feet test range is required, even when each transceiver within the AOTD is individually tested from one corner of the test range.

FIG. 2 illustrates an electro-optic range-finding device under test and a test/calibration system configuration according to embodiments of the present disclosure. In FIG. 2, the test/calibration system 200 is also positioned proximate to an AOTD under test that includes four transceivers, one per quadrant, within a housing 101, with each quadrant of the housing 101 including the laser aperture 102 and the detector aperture 106 as described above. In test/calibration system 200, however, glass fibers 201, 202 (also known as "optical fibers" or "fiber optics") receive a portion of the 90° fan beam emitted through the laser aperture 102. First, receiving or "input" ends of the glass fibers 201, 202 are held in position proximate to the laser aperture 102 by a support (not shown in FIG. 2), with the ends positioned in the fan beam to receive emitted laser pulses and with a positional mask 203 allowing flexible and robust selection of the portion of the fan beam received. Second, emitting or "output" ends of the glass fibers 201, 202 are held in position proximate to the detector aperture 106 by the support, with the ends positioned to emit "reflected" light pulses into the detector aperture 106 and with a positional mask 204 allowing flexible and robust selection of the "reflected" light received by the AOTD receiver. The height and relative angle of the emitting ends of glass fibers 201, 202 corresponds to the target angle.

The glass fibers 201, 202 have different lengths, to delay the laser pulses by amounts corresponding to different target distances. That is, it will take a longer amount of time for laser pulses to propagate along the entirety of the longer glass fiber 202, from input end to output end, than along the entirety of the shorter glass fiber 201, to correlate to the round-trip travel time for the different target distance. Glass fibers 201, 202 each include a fiber attenuator 205, 206 connected at some point along its respective length, to reduce the signal level of propagating laser pulses by an amount corresponding to the target distance and reflectance. That is, the amplitude of laser pulses propagating along the longer glass fiber 202, from input end to output end, will be reduced more than the amplitude of laser pulses propagating along the shorter glass fiber 201, to correlate to the target distance. The amplitude of all pulses may also be reduced by an additional increment correlating to the target reflectance. Similar to operation with the test/calibration system of FIG. 1, the AOTD rotates relative to the "target" (in FIG. 2, the fibers) to scan the fiber input and output across each respective quadrant. For the system of FIG. 2, replacing direct light paths and a target with optical fibers and attenuators, the floor space required is reduced to less than 2 feet×2 feet.

By selection of characteristics for the glass fibers 201, 202 and fiber attenuators 205, 206, changes to the software required for test/calibration of the same AOTD using the test/calibration system 200 may be reduced or minimized. The glass fibers 201, 202 and fiber attenuators 205, 206 may be selected so that the test/calibration system 200 behaves substantially similarly to the test/calibration system 100. As noted above, the length of glass fibers 201, 202 may each be selected so that the time of propagation of laser pulses along that length is similar to the round-trip travel time to and from the target 103 for one of the test distances used with the test/calibration system 100 (with the difference in the time of transit for the light pulses through air and the medium of the glass fibers 201, 202 being negligible for the distances and corresponding fiber lengths involved). The delay between emitting a pulse and receiving a "reflected" pulse in the test/calibration system 200 may thus effectively match the corresponding delay in the test/calibration system 100. As also noted above, fiber attenuators 205, 206 may be selected to attenuate the laser pulses by an amount comparable to (a) reflection off the target 103 with known reflectance used with the test/calibration system 100, and (b) travel by the light pulses of a predetermined distance through open space. In addition, the angle of an axial center for the input ends of the glass fibers 201, 202 relative to the fan beam emitted by the laser and the angle of an axial center for the output ends of the glass fibers 201, 202 relative to the detector in a device under test by the test/calibration system 200 may each be set to correspond to a corresponding target location for the test/calibration system 100. With such a design, only nominal changes to the test/calibration software should be required.

Figure 3:
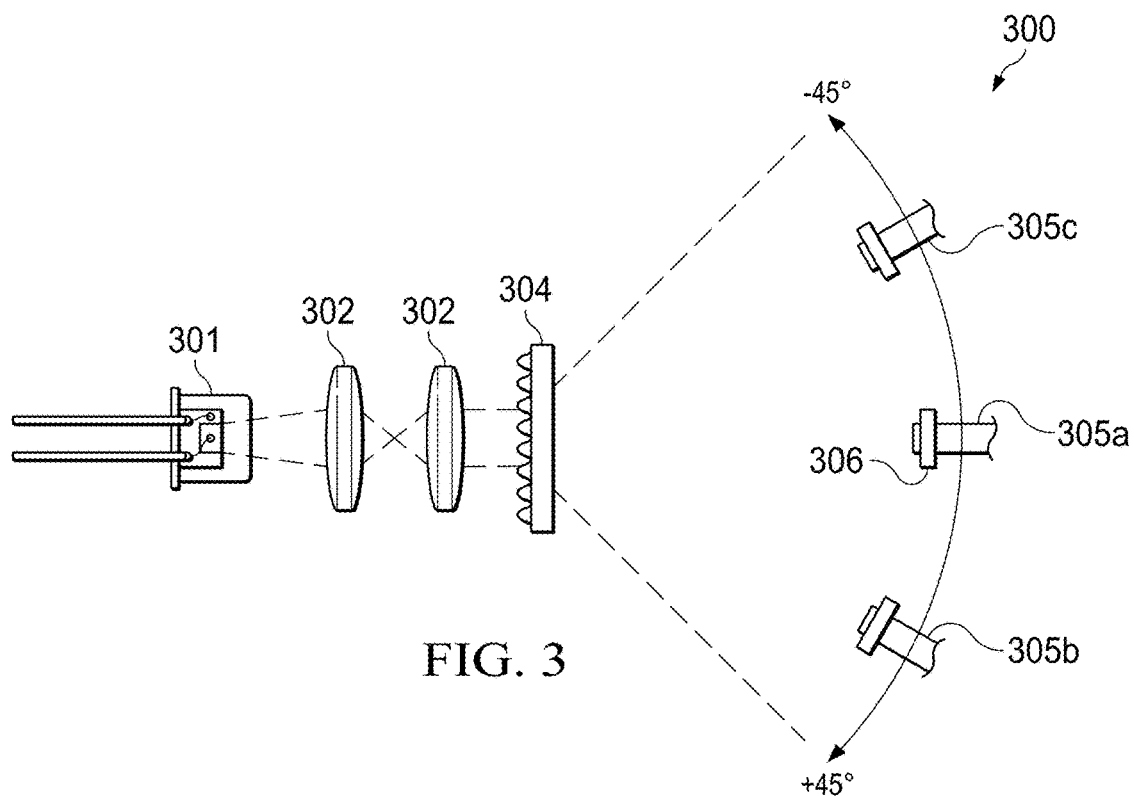
FIG. 3 is a diagram schematically illustrating the placement of input ends for glass fibers in the test/configuration system of FIG. 2 relative to a laser transmitter of an electro-optic range-finding device under test.

FIG. 3 is a diagram schematically illustrating the placement of input ends for glass fibers in the test/configuration system of FIG. 2 relative to a laser transmitter of an electro-optic range-finding device under test. The laser transmitter 300 for one quadrant in an AOTD includes a laser diode 301 with electrical connections to control circuitry (not shown) for controlling the laser diode 301 to emit pulses of light. The emitted light passes through collimating lens(es) 302 and, for the embodiment of FIGS. 2 and 3, spreader lens(es) 304 forming a fan beam for each light pulse. In other embodiments with EO devices employing substantially collimated cylindrical ("pencil-beam") or conical emitted light, the spreader lens(es) 304 may be omitted or replaced with other optical devices, such as polarizers, filters, or the like.

The laser transmitter 300 is mounted within the housing 101 of the AOTD proximate to the laser aperture 102, to emit light through the laser aperture. As described above, the laser aperture 102 may be covered by a material (not shown in FIG. 3) largely transparent to the laser light. During testing/calibration, the input ends 305a, 305b, and 305c of the glass fibers (e.g., glass fibers 201, 202 in FIG. 2) are held proximate to the exterior surface of such transparent cover. As used herein, the term "proximate," when used to describe the position of input ends of glass fibers to an EO device being tested/calibrated, means sufficient both to interpose a positional mask (e.g., positional masks 203, 204 in FIG. 2) between the EO device and the nearest surface of the input ends facing the EO and to leave enough clearance between the transparent cover over the laser aperture and the nearest surfaces of the input ends (or the interposing positional mask) facing that transparent cover to allow rotation of the AOTD during testing. Otherwise, however, the distance is preferably predetermined and consistently reproducible during testing of different AOTDs using the test/calibration system 200. It should be noted that the apparent discrepancy between the two glass fibers 201, 202 depicted in FIG. 2 and the three input ends 305a, 305b, and 305c of the glass fibers depicted in FIG. 3 is deliberate, to emphasize that the number of glass fibers 201, 202 is not limited to two, but may be any number useful in testing of the AOTD.

As shown in FIG. 3, the input ends 305a, 305b, and 305c of the glass fibers may be positioned at different angular positions relative to the spread of the emitted fan beam, all oriented toward a common point. Generally, the energy of light pulses from the laser transmitter is spread over approximately 90° to intersect the field of view at a constant range for all roll angles. For such fan beams, it may be beneficial to distribute the input ends 305a, 305b, and 305c of the glass fibers at different angular positions relative to the fan beam's centerline and ±45° edges—that is, at different positions surrounding part of the AOTD's circumferential perimeter. This allows the test/calibration system 200 to effectively scan across the fan beam to provide diagnostics of beam characteristics as the AOTD rotates. In that respect, is should be noted that FIG. 3 is intended to be in the nature of a plan view for the fan beam of the laser transmitter. A side view of the same fan beam would be similar, but with much less spread. Nonetheless, multiple input ends of the glass fibers may likewise be positioned at different angular positions relative to the vertical spread of the emitted fan beam—that is, at different positions along the height of the AOTD—but similarly oriented toward the same common point as the input ends 305a, 305b, and 305c shown in FIG. 3. Such vertical distribution of the glass fiber input ends relative to the AOTD's height may be used for beam dissection.

Figure 4:
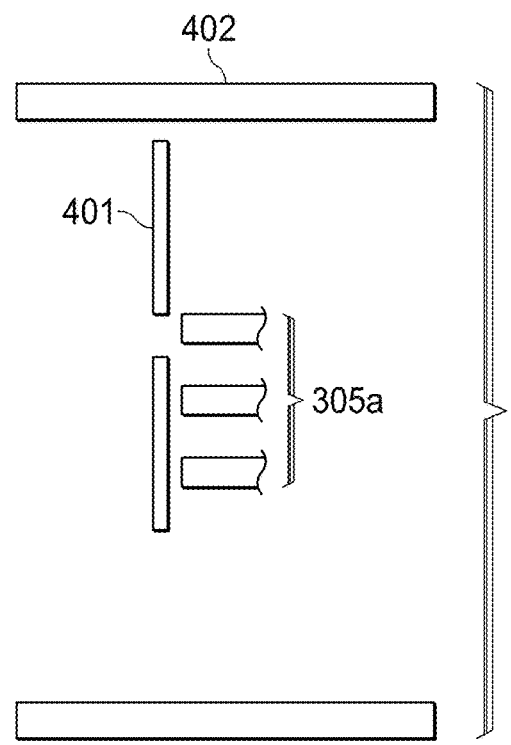
FIG. 4 is a diagram schematically illustrating multiple glass fiber ends with an optional associated positional mask and optional shroud used for either input or output ends of the glass fibers in the test/configuration system of FIG. 2.

While a distribution of single input ends 305a, 305b, and 305c is illustrated in FIG. 3, those skilled in the art will recognize that each input end depicted in FIG. 3 may in in fact comprise a plurality of close-spaced glass fiber input ends. That is, each of glass fiber 201, 202 depicted in FIG. 2 may actually comprise a bundle of closely-spaced glass fibers, such that both the input ends and the output ends are likewise closely-spaced. As used herein, "fiber bundle" or "bundle of fibers" may comprise a single fiber, but preferably includes a plurality of fibers. As used herein, "closely-spaced," when used to describe glass fiber ends, means having a spacing that results in negligible changes in received or emitted light, such that the closely-spaced glass fiber ends may be treated as receiving or emitting the same light, and in contrast to deliberate spacing of the glass fiber ends at different locations along the perimeter or height of the fan beam as previously described. For example, FIG. 4 diagrammatically illustrates three closely spaced glass fiber ends and an associated positional mask 401 of the type described above in connection with FIG. 2. The opaque, rectangular positional mask shown in cross-section in FIG. 4 is disposed near the glass fiber ends, with an aperture that may be shifted into alignment with one of the fiber ends either to allow light from the AOTD to pass into the respective one of the glass fiber ends while blocking light from the AOTD from entering the remaining glass fiber ends (for input ends), or to allow light from the glass fiber to pass from the respective one of the glass fiber ends onto the AOTD while blocking light from the remaining glass fiber ends from reaching the AOTD (for output ends).

Thus, for example, the input end 305a depicted in FIG. 3 may actually comprise the ends of three (or fewer, or more) glass fibers that are effectively multiplexed by shifting the associated positional mask so that the aperture is aligned with a selected one. Likewise, the output ends of glass fibers 201, 202 in FIG. 2 may comprise a plurality of close-spaced fiber ends with (optionally) an associated positional mask 401 of the type depicted in FIG. 4 for effectively multiplexing light from the glass fibers. It should be noted that a positional mask associated with only one of either the input ends or the output ends of a closely-spaced bundle of glass fibers may be sufficient, or that coordinately-controlled positional masks associated with each of the input ends and the output ends may be employed.

Referring back to FIG. 3, the input ends 305a, 305b, and 305c (and optional associated positional mask) are each held in position relative to the transparent cover over the laser aperture 102 for an AOTD being tested/calibrated by mounts 306. Each mount 306 may be fixed or adjustable, and should hold the respective glass fiber end(s) within a predetermined spacing from and relative orientation to the laser aperture 102 for the AOTD being tested. In some embodiments, the mounts 306 may be supported by a common frame and may be adjustable to hold the respective glass fiber end(s) at preset positions having the predetermined spacing from and relative orientation to a particular EO device being tested. Thus, for example, a certain preset position for each of the mounts 306 would correspond to the fan beam AOTD previously described, while another preset position for each mount 306 would correspond to a different type of AOTD, such as a device using differently-shaped collimated light.

Referring once again to FIG. 2, the detector aperture 106 may also be covered by a material largely transparent to the laser light and, during testing/calibration, the output ends of the glass fibers 201, 202 are held proximate to the exterior surface of such transparent cover over the detector aperture. Those skilled in the art will recognize that the description above regarding the glass fiber input ends, the laser aperture 102 and transparent cover, and the mounts 306 also applies to the glass fiber output ends, the detector aperture 106 and a transparent cover for that aperture, and mounts holding the glass fiber output ends. Rather than positioning input ends relative to a fan beam, as described in connection with FIG. 3, the output ends are instead positioned relative to the detector's field of view. Therefore, to avoid unnecessary duplication, and for simplicity and clarity, the description above regarding the input ends of the glass fibers 201, 202 depicted in FIG. 2 will not be repeated for the output ends. Those skilled in the art will recognize that, for testing/calibration of an electro-optic range-finding device having a single, common laser and detector aperture, the same mounts 306 may hold both the glass fiber input ends and the glass fiber output ends.

The test/calibration system 100 also permits the possibility of background reflection (off surrounding objects) returning light from the laser aperture 102 to the detector aperture 106, as well as reflection off the target 103. The use of glass fibers 201, 202 in the test/calibration system 200 mitigates that possibility, particularly if at least the output ends of the glass fibers 201, 202 and the detector aperture 106 are at least partially enclosed by a shroud 402 such as is depicted in FIG. 4. The shroud 402 may be formed of an opaque, flexible material that is positioned to lightly contact (or not contact) the housing 101 around the detector aperture 106, without interfering with rotation of the AOTD during testing/calibration.

Figure 5:
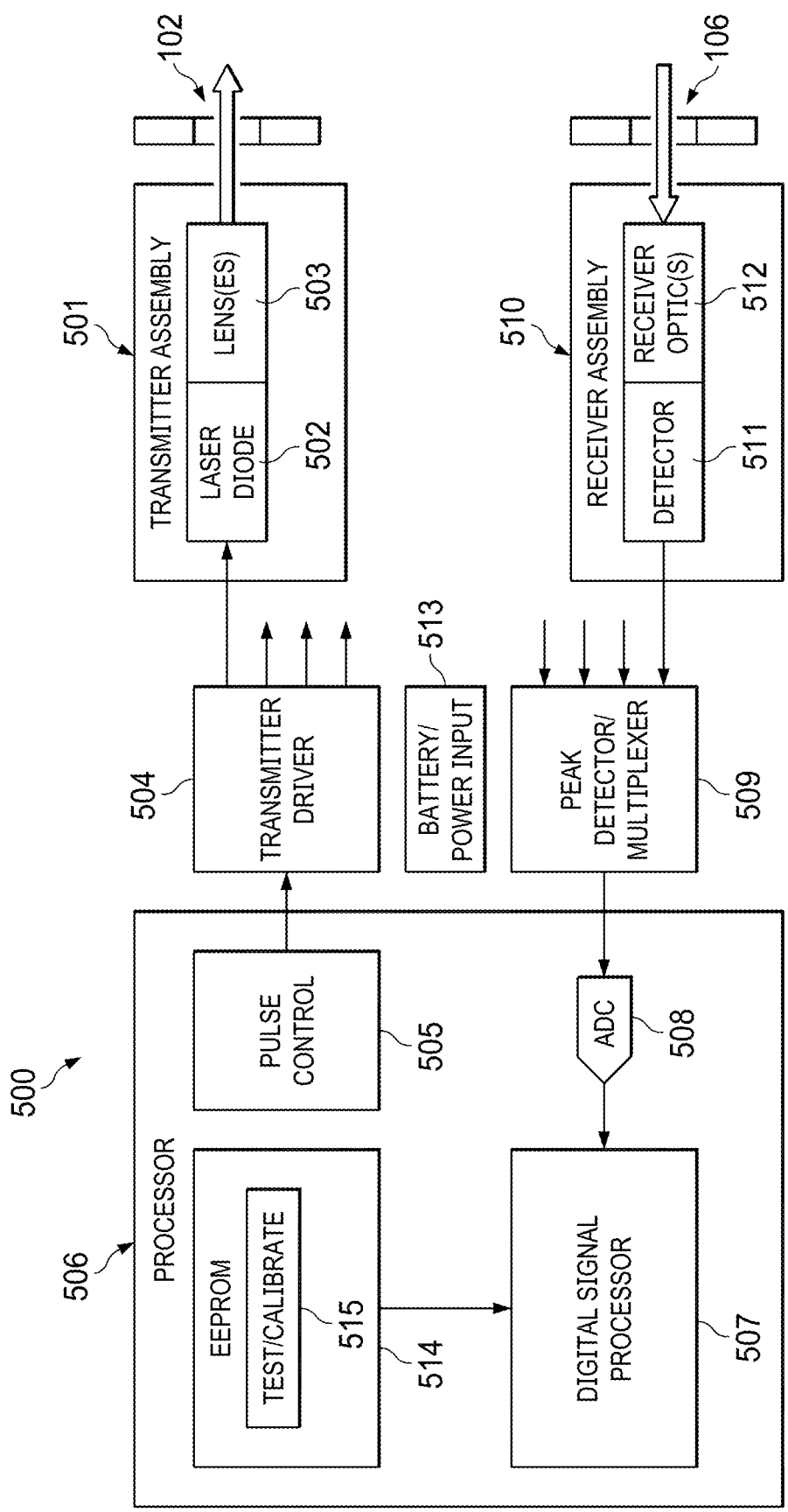
FIG. 5 is a high level block diagram for the electro-optic portions of an electro-optic range-finding device under test within a test/calibration system according to embodiments of the present disclosure.

FIG. 5 is a high level block diagram for the electro-optic portions of an electro-optic range-finding device under test within a test/calibration system 200 according to embodiments of the present disclosure. The electro-optic system 500 may be entirely within the electro-optics of a device being tested/calibrated, except for an external power connection, and is used during testing of the electro-optic range-finding device but does not form part of the test/calibration system 200 (since it may be replaced by the electro-optic system of another device to be tested/calibrated). The electro-optic system 500 includes a transmitter assembly 501 including a laser diode 502 (together with any integrated synchronization control, temperature compensation circuit, etc.) and lens(es) 503, such as collimating and/or spreading lenses of the type described above. The transmitter assembly 501 emits pulses of light through the laser aperture 102 of the housing 101. Transmission of light pulses by the transmitter assembly 501 is based on signals from transmitter driver 504, which selectively drives four laser diodes, one for each quadrant. The transmitter driver 504 operates in response to pulse control circuit 505 within a processor 506.

Processor 506 is a set of electrical circuits, preferably integrated in a single package, that are configured and optionally may be at least partially programmable to perform various signal processing on signals received at inputs to the processor 506 and control signal generation operations for producing timing and other control signals at outputs of the processor 506. While any of a variety of commercial or custom processors may be used as processor 506, those skilled in the art will recognize that the term "processor," when used herein (including in the claims submitted herewith or later presented) to reference processor 506, refers to a specific class of signal processing and control circuits commonly referred to in the relevant art as, variously, a "processor," a "microprocessor," a "controller," a "microcontroller," or a "field programmable gate array." The selection and programming of suitable commercial processors, or alternatively the design and (to the extent necessary) programming of a custom processor, to implement the processor 506 and perform the functions described herein is within the ordinary skill of technicians within the industry, when acting under the guidance of those having ordinary skill in the relevant art.

Processor 506 preferably includes a digital signal processing (DSP) core 507, which receives digital values from on-chip analog-to-digital converter (ADC) 508. The digital values received by DSP core 507 are representative of the analog output sampled, periodically or under asynchronous control, from peak detector and/or multiplexer 509. The peak detector portion of peak detector and/or multiplexer 509 may, for example, be a circuit latching a peak analog value received. The multiplexer portion of peak detector and/or multiplexer 509 multiplexes between the outputs of receiver assemblies for each of the four quadrants. The receiver assembly 510 for the same quadrant containing transmitter assembly 501 thus provides one input to the peak detector and/or multiplexer 509.

The receiver assembly 510 includes a detector 511 (e.g., a photodiode or the like, together with any integrated amplifier(s), temperature compensation circuit, signal conditioning circuit, etc.) and receiver optic(s) 512, which may include lenses, optical filter(s), polarizers, and the like. The receiver assembly 510 receives return of "reflected" light through the detector aperture 106 of the housing 101.

Electro-optic system 500 also includes a battery and/or power input 513 for powering the remaining electrical components of the electro-optic system 500, with the power connections omitted from FIG. 5 for clarity.

Processor 506 includes a memory 514, which in the example shown is an erasable, electrically programmable read only memory (such as flash memory), that contains instructions executable by the DSP core 507, pulse control 505 and other programmable circuits within the processor 506. A portion of the program of machine-executable instructions within the memory 514 is a set of test/calibrate routines 515, which cause the pulse control 505 to trigger light pulses by the transmitter assembly 501 and cause the ADC 508 and DSP core 507 to process signals output by the receiver assembly responsive to return of "reflected" light. When the electro-optic system 500 is used in connection with the test/calibration system 200, the return is actually light propagated along glass fibers 201, 202 and through positional masks 203, 204 selected to emulate a target of known reflectance at each of one or more known distances from the laser aperture 102 and detector aperture 106. As a result, the test/calibrate routines 515 for processor 506 when used with the test/calibration system 200 are very similar to the corresponding test and calibration software that would be used by the same processor when the device is operated with the test/calibration system 100. That is, the time-of-flight and amplitude measured for the return of "reflected" light are used to confirm or adjust and set thresholds for the AOTD being operated with the test/calibration system 200 to use in determining that a target is within a predetermined range, and/or to determine whether the target is getting closer or further away from the AOTD.

Figure 6:
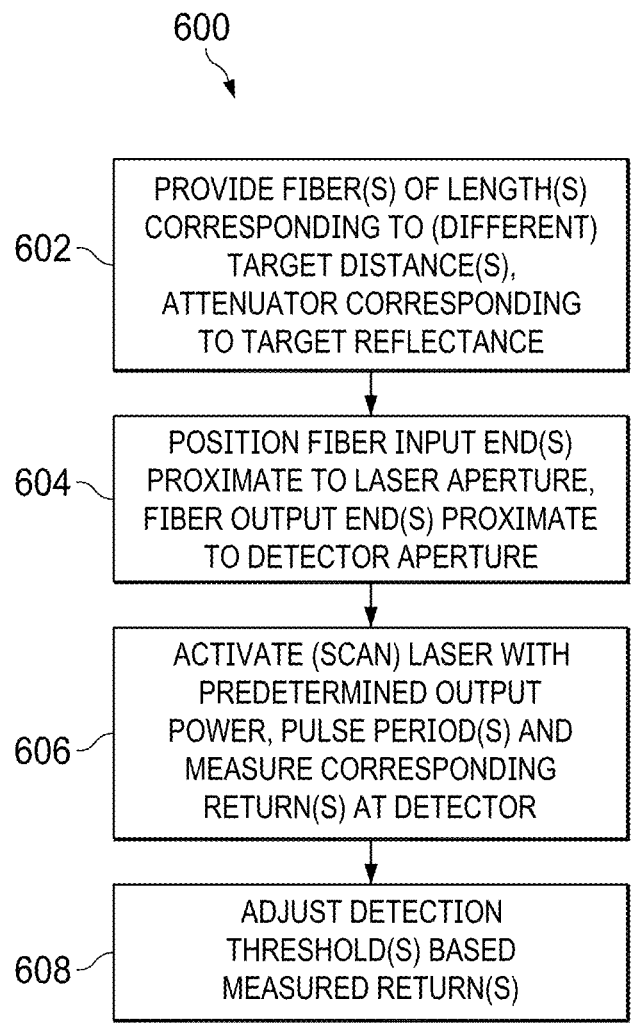
FIG. 6 is a high level flow diagram for test/calibration of an electro-optic range-finding device according to one embodiment of the present disclosure.

FIG. 6 is a high level flow diagram for test/calibration of an electro-optic range-finding device according to one embodiment of the present disclosure. The process may be employed with the test/calibration system configuration of FIG. 2 and the optical range-finding system of FIG. 5, or with other optical range-finding systems. The process 600 begins with providing one or more fiber(s) with a length corresponding to a target distance used for testing/calibration, each with a fiber attenuator corresponding to a reflectance of a target used for testing/calibration and light propagation through open space over the target distance (step 602). As discussed above, multiple fibers of different lengths may be employed, as well as multiple, same-length fibers for each of multiple target distances. The fiber input end(s) are positioned proximate to the laser aperture for the device to be tested/calibrated, and the fiber output end(s) are positioned proximate to the detector aperture (step 604). As discussed above, distance and/or relative angle of the fiber ends may be used to simulate target distance or relative position. The laser of the device under test is then activated and, for appropriate beam shapes, scanned across the fiber input(s), with the return(s) from the fiber output(s) measured by the detector of the device under test (step 606). Based on the measured return(s), detection threshold(s) within the device under test are confirmed or adjusted as necessary (step 608). The process may be repeated iteratively for a single device under test, and repeated as necessary for different devices.

Providing a more compact test range of the type depicted in FIG. 2 with adequate propagation of test signals meets a long-felt need in EO device testing and/or calibration. As discussed, current ranges operate in the open air requiring large spaces. With the use of optical fiber in place of open air paths as disclosed, coiling the fiber can greatly reduce the space required.

The test/calibration system of FIG. 2 replaces the open floor space area of alternative test ranges with an appropriate array of fibers. The smaller per-system dimensions allow the same space to be employed with increased AOTD testing/calibration capacity. Since light signals traverse the fibers at a speed less than the speed of light in free space, the length of the fibers is chosen to correspond to the round-trip travel time of light in free space reflecting off a target at a specified distance. Since some object or target detection devices use time of flight of an EO pulse in the open to detect distance, time of flight is preserved by using an appropriate length of fiber. The physical pulse length in the fiber is also shorter than in air, but can be compensated for (to the extent necessary).

The fibers can be coiled to reduce linear distance, creating a compact test range. Typical floor space reduction would be from a square 40 feet on each side to a square of about 24 inches on each side. Location of multiple fibers along a line parallel to the AOTD axis is used for beam dissection, and location of the fiber inputs can be arranged to scan across a fan beam to provide diagnostics of beam height as the AOTD rotates. The location of the fiber outputs can be arranged to represent different target distances. Selectable combinations of fiber input and output can provide test set diagnostics for each AOTD.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The description in the present application should not be read as implying that any particular element, step, or function is an essential or critical element which must be included in the claim scope: the scope of patented subject matter is defined only by the allowed claims. Moreover, none of these claims are intended to invoke 35 USC § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

What is claimed is:

1. A test equipment, comprising:
   multiple fiber bundles each having a length selected to correspond to a predetermined time-of-flight for light pulses to travel from a laser aperture of an electro-optic range-finding device to a target and back to a detector aperture of the range-finding device, wherein:
   an input end of each of the fiber bundles is positioned proximate to the laser aperture and is configured to receive a portion of light emitted through the laser aperture, wherein the input ends of the fiber bundles are positioned at different angular positions and are oriented toward a common point,
   an output end of each of the fiber bundles is positioned proximate to the detector aperture and is configured to emit light from the respective fiber bundle through the detector aperture, and
   each of the fiber bundles comprises a plurality of fibers;
   fiber attenuators connected along the fibers of the fiber bundles, each fiber attenuator configured to attenuate an amplitude of light propagating through the respective fiber by an amount corresponding to a target of known reflectance and distance; and
   a positional mask configured to be positioned between the input end of a specified one of the fiber bundles and the laser aperture of the range-finding device, the positional mask including an aperture that allows light from the laser aperture to enter one of the fibers of the specified fiber bundle while blocking light from the laser aperture from entering one or more remaining fibers of the specified fiber bundle.

2. The test equipment according to claim 1, wherein the fiber bundles are each coiled to reduce a linear distance over which the fiber bundles extend.

3. The test equipment according to claim 1, wherein the fiber bundles comprise:
   a first fiber bundle having a first length corresponding to a first time-of-flight for light pulses; and
   a second fiber bundle having a second length corresponding to a second time-of-flight for light pulses.

4. The test equipment according to claim 3, wherein:
   the fiber attenuators connected along the fibers of the first fiber bundle are each configured to attenuate an amplitude of light pulses within the respective fiber by at least an amount corresponding to the first time-of-flight for light pulses propagating a first distance in open air; and
   the fiber attenuators connected along the fibers of the second fiber bundle are each configured to attenuate an amplitude of light pulses within the respective fiber by at least an amount corresponding to the second time-of-flight for light pulses propagating a second distance in open air.

5. The test equipment according to claim 1, wherein the input ends of the fiber bundles are distributed at spaced-apart points along a cross-section of the light emitted through the laser aperture.

6. The test equipment according to claim 1, wherein the test equipment further includes a second positional mask configured to be positioned between the output end of the specified one of the fiber bundles and the detector aperture of the range-finding device, the second positional mask including an aperture that allows light from one of the fibers of the specified fiber bundle to enter the detector aperture while blocking light from one or more remaining fibers of the specified fiber bundle from entering the detector aperture.

7. The test equipment according to claim 6, wherein at least one of:
the positional mask is configured to multiplex light from the laser aperture to the fibers; or
the second positional mask is configured to multiplex light from the fibers to the detector aperture.

8. The test equipment according to claim 1, wherein the input end of each of the fiber bundles, positioned proximate to the laser aperture, and the output end of each of the fiber bundles, positioned proximate to the detector aperture, are positioned proximate to separate, spaced-apart laser and detector apertures of the electro-optic range-finding device.

9. A method, comprising:
operating an electro-optic range-finding device to emit light pulses through a laser aperture and receive light through a detector aperture;
positioning multiple fiber bundles to carry a portion of light in the light pulses from the laser aperture to the detector aperture, the fiber bundles each having a length selected to correspond to a predetermined time-of-flight for the light pulses to travel from the laser aperture to the detector aperture, wherein:
an input end of each of the fiber bundles is positioned proximate to the laser aperture and is configured to receive a portion of light emitted through the laser aperture, wherein the input ends of the fiber bundles are positioned at different angular positions and are oriented toward a common point,
an output end of each of the fiber bundles is positioned proximate to the detector aperture and is configured to emit light from the respective fiber bundle through the detector aperture, and
each of the fiber bundles comprises a plurality of fibers;
using each of multiple fiber attenuators connected along the fibers of the fiber bundles to attenuate an amplitude of light propagating through the respective fiber by an amount corresponding to a target of known reflectance and distance; and
using a positional mask positioned between the input end of a specified one of the fiber bundles and the laser aperture of the range-finding device, the positional mask including an aperture that allows light from the laser aperture to enter one of the fibers of the specified fiber bundle while blocking light from the laser aperture from entering one or more remaining fibers of the specified fiber bundle.

10. The method according to claim 9, further comprising:
coiling the fiber bundles to reduce a linear distance over which the fiber bundles extend.

11. The method according to claim 9, wherein the fiber bundles comprise:
a first fiber bundle having a first length corresponding to a first time-of-flight for light pulses; and
a second fiber bundle having a second length corresponding to a second time-of-flight for light pulses.

12. The method according to claim 11, wherein:
the fiber attenuators connected along the fibers of the first fiber bundle each attenuate an amplitude of light pulses within the respective fiber by at least an amount corresponding to the first time-of-flight for light pulses propagating a first distance in open air; and
the fiber attenuators connected along the fibers of the second fiber bundle each attenuate an amplitude of light pulses within the respective fiber by at least an amount corresponding to the second time-of-flight for light pulses propagating a second distance in open air.

13. The method according to claim 9, wherein the input ends of the fiber bundles are distributed at spaced-apart points along a cross-section of the light emitted through the laser aperture.

14. The method according to claim 9, further comprising:
using a second positional mask positioned between the output end of the specified one of the fiber bundles and the detector aperture of the range-finding device, the second positional mask including an aperture that allows light from one of the fibers of the specified fiber bundle to enter the detector aperture while blocking light from one or more remaining fibers of the specified fiber bundle from entering the detector aperture.

15. The method according to claim 14, wherein at least one of:
the positional mask multiplexes light from the laser aperture to the fibers; or
the second positional mask multiplexes light from the fibers to the detector aperture.

16. An apparatus, comprising:
a first fiber bundle having a first length selected such that a time-of-flight for light pulses to travel from an input end of the first fiber bundle to an output end of the first fiber bundle corresponds to a time-of-flight for the light pulses to travel a first distance in open air, wherein the first fiber bundle comprises a plurality of first fibers;
first fiber attenuators connected along the first fibers of the first fiber bundle and each configured to attenuate an amplitude of light propagating through the respective first fiber by an amount corresponding to reflection of light traveling in open air from a target of known reflectance at the first distance;
a second fiber bundle having a second length selected such that a time-of-flight for light pulses to travel from an input end of the second fiber bundle to an output end of the second fiber bundle corresponds to a time-of-flight for the light pulses to travel a second distance in open air, wherein the second fiber bundle comprises a plurality of second fibers;
second fiber attenuators connected along the second fibers of the second fiber bundle and each configured to attenuate an amplitude of light propagating through the respective second fiber by an amount corresponding to reflection of light traveling in open air from the target of known reflectance at the second distance; and
a positional mask disposed at the input end of the first fiber bundle, the positional mask including an aperture that allows light from a laser aperture to enter one of the first fibers of the first fiber bundle while blocking light from the laser aperture from entering one or more remaining first fibers of the first fiber bundle,
wherein the first and second fiber bundles are coiled to reduce a linear distance over which the first and second fiber bundles extend, and
wherein the input ends of the first and second fiber bundles are positioned at different angular positions and are oriented toward a common point.

17. The apparatus according to claim 16, further comprising:
a second positional mask disposed at the output end of the first fiber bundle, the second positional mask including an aperture that allows light from one of the first fibers of the first fiber bundle to enter a detector aperture while blocking light from one or more remaining first fibers of the first fiber bundle from entering the detector aperture.

18. A system comprising the apparatus according to claim 16, wherein the system further comprises:
  an electro-optic range-finding device having the laser aperture and a detector aperture, wherein the input end of each of the first and second fiber bundles is positioned proximate to the laser aperture and is configured to receive a portion of light emitted through the laser aperture, and wherein the output end of each of the first and second fiber bundles is positioned proximate to the detector aperture and is configured to emit light from the respective fiber bundle through the detector aperture, wherein the electro-optic range-finding device further comprises:
  a light transmitter assembly configured to emit the light pulses through the laser aperture;
  a light receiver assembly configured to receive light through the detector aperture; and
  a processor configured to calibrate the electro-optic range-finding device based on light received through the detector aperture from the first and second fiber bundles based on light emitted through the laser aperture into the first and second fiber bundles.

19. The system of claim 18, wherein the positional mask is configured to multiplex light from the laser aperture to the fibers.

20. The apparatus of claim 16, wherein the positional mask is configured to multiplex light from the laser aperture to the first fibers.

* * * * *